(12) United States Patent
Robinson et al.

(10) Patent No.: US 7,614,550 B1
(45) Date of Patent: Nov. 10, 2009

(54) SYSTEM AND METHOD FOR NEGOTIABLE INSTRUMENT CASHING FEE SETUP BY TYPE

(75) Inventors: Timothy L. Robinson, Reston, VA (US); Bradford R. Schildt, Boulder, CO (US); Tennille V. Goff, Springfield, VA (US); Daniel J. Corwin, Fredericksburg, VA (US); Timothy Neil Watson, Alexandria, VA (US)

(73) Assignee: Phoenix Check Cashing, Inc., Herndon, VA (US)

( * ) Notice: Subject to any disclaimer, the term of this patent is extended or adjusted under 35 U.S.C. 154(b) by 509 days.

(21) Appl. No.: 11/232,878

(22) Filed: Sep. 23, 2005

Related U.S. Application Data

(63) Continuation-in-part of application No. 10/142,687, filed on May 10, 2002, now Pat. No. 6,957,770.

(51) Int. Cl.
*G06K 5/00* (2006.01)
(52) U.S. Cl. .................. 235/382; 235/379; 235/380
(58) Field of Classification Search ................ 235/382, 235/379, 375, 380; 705/10, 14, 44
See application file for complete search history.

(56) References Cited

U.S. PATENT DOCUMENTS

| | | | |
|---|---|---|---|
| 4,109,238 A | 8/1978 | Creekmore | |
| 4,187,498 A | 2/1980 | Creekmore | |
| 4,580,040 A | 4/1986 | Granzow et al. | |
| 4,617,457 A | 10/1986 | Granzow et al. | |
| 4,672,377 A | 6/1987 | Murphy et al. | |
| 4,975,969 A | 12/1990 | Tal | |
| 4,993,068 A | 2/1991 | Piosenka et al. | |
| 4,995,086 A | 2/1991 | Lilley et al. | |
| 5,053,607 A | 10/1991 | Carlson et al. | |
| 5,095,194 A | 3/1992 | Barbanell | |
| 5,144,680 A | 9/1992 | Kobayashi et al. | |
| 5,305,196 A * | 4/1994 | Deaton et al. ................. 705/10 |
| 5,327,508 A | 7/1994 | Deaton et al. | |
| 5,341,428 A | 8/1994 | Schatz | |
| 5,386,103 A | 1/1995 | DeBan et al. | |
| 5,448,471 A | 9/1995 | Deaton et al. | |

(Continued)

FOREIGN PATENT DOCUMENTS

EP 0991006 A2 4/2000

(Continued)

OTHER PUBLICATIONS

S. Davies. Touching Big Brother. How Biometric Technology Will Fuse Flesh and Machine. Information Technology & People. vol. 7 (4) 1994.

(Continued)

*Primary Examiner*—Ahshik Kim
(74) *Attorney, Agent, or Firm*—Finnegan, Henderson, Farabow, Garrett & Dunner, LLP

(57) ABSTRACT

A method of providing negotiable instrument cashing merchants the ability to readily customize, store locally or centrally, and update manually or automatically, preferences related to negotiable instrument cashing transactions. The present invention imparts a process by which cashers utilizing a negotiable instrument cashing system can store and update fee and surcharge preferences, share them with affiliated cashers, and apply the preferences to negotiable instrument cashing transactions.

27 Claims, 3 Drawing Sheets

U.S. PATENT DOCUMENTS

| | | | |
|---|---|---|---|
| 5,469,506 | A | 11/1995 | Berson et al. |
| 5,513,272 | A | 4/1996 | Bogosian, Jr. |
| 5,581,630 | A | 12/1996 | Bonneau, Jr. |
| 5,592,377 | A | 1/1997 | Lipkin |
| 5,592,560 | A | 1/1997 | Deaton et al. |
| 5,613,012 | A | 3/1997 | Hoffman et al. |
| 5,620,061 | A | 4/1997 | Fraser |
| 5,621,812 | A | 4/1997 | Deaton et al. |
| 5,638,457 | A | 6/1997 | Deaton et al. |
| 5,642,485 | A | 6/1997 | Deaton et al. |
| 5,644,723 | A | 7/1997 | Deaton et al. |
| 5,649,114 | A | 7/1997 | Deaton et al. |
| 5,659,469 | A | 8/1997 | Deaton et al. |
| 5,679,938 | A | 10/1997 | Templeton et al. |
| 5,687,322 | A | 11/1997 | Deaton et al. |
| 5,802,199 | A | 9/1998 | Pare, Jr. et al. |
| 5,838,812 | A | 11/1998 | Pare et al. |
| 5,897,625 | A | 4/1999 | Gustin et al. |
| 5,910,988 | A | 6/1999 | Ballard |
| 6,009,411 | A | 12/1999 | Kepecs |
| 6,012,039 | A | 1/2000 | Hoffman et al. |
| 6,023,688 | A | 2/2000 | Ramachandran et al. |
| 6,032,137 | A | 2/2000 | Ballard |
| 6,036,344 | A | 3/2000 | Goldenberg |
| 6,045,039 | A | 4/2000 | Stinson et al. |
| 6,067,524 | A | 5/2000 | Byerly et al. |
| 6,129,273 | A | 10/2000 | Shah |
| 6,145,738 | A | 11/2000 | Stinson et al. |
| 6,149,056 | A | 11/2000 | Stinson et al. |
| 6,164,528 | A | 12/2000 | Hills et al. |
| 6,202,055 | B1 | 3/2001 | Houvener et al. |
| 6,222,914 | B1 | 4/2001 | McMullin |
| 6,230,148 | B1 | 5/2001 | Pare, Jr. et al. |
| 6,240,394 | B1 | 5/2001 | Uecker et al. |
| 6,282,523 | B1 | 8/2001 | Tedesco et al. |
| 6,283,366 | B1 | 9/2001 | Hills et al. |
| 6,286,756 | B1 | 9/2001 | Stinson et al. |
| 6,292,786 | B1 | 9/2001 | Deaton et al. |
| 6,307,958 | B1 | 10/2001 | Deaton et al. |
| 6,310,966 | B1 | 10/2001 | Dulude et al. |
| 6,327,573 | B1 | 12/2001 | Walker et al. |
| 6,328,207 | B1 | 12/2001 | Gregoire et al. |
| 6,330,543 | B1 | 12/2001 | Kepecs |
| 6,334,108 | B1 | 12/2001 | Deaton et al. |
| 6,334,109 | B1 | 12/2001 | Kanevsky et al. |
| 6,351,735 | B1 | 2/2002 | Deaton et al. |
| 6,354,491 | B2 | 3/2002 | Nichols et al. |
| 6,377,935 | B1 | 4/2002 | Deaton et al. |
| 6,389,401 | B1 | 5/2002 | Kepecs |
| 6,415,262 | B1 | 7/2002 | Walker et al. |
| 6,424,949 | B1 | 7/2002 | Deaton et al. |
| 6,456,981 | B1 | 9/2002 | Dejaeger et al. |
| 6,464,134 | B1 | 10/2002 | Page |
| 6,507,279 | B2 | 1/2003 | Loof |
| 6,516,302 | B1 | 2/2003 | Deaton et al. |
| 6,547,129 | B2 | 4/2003 | Nichols et al. |
| 6,578,760 | B1 | 6/2003 | Otto |
| 6,592,029 | B2 | 7/2003 | Brikho |
| 6,609,104 | B1 | 8/2003 | Deaton et al. |
| 6,611,811 | B1 | 8/2003 | Deaton et al. |
| 6,647,372 | B1 | 11/2003 | Brady et al. |
| 6,659,341 | B1 | 12/2003 | Wang |
| 6,669,086 | B2 | 12/2003 | Abdi et al. |
| 6,684,195 | B1 | 1/2004 | Deaton et al. |
| 6,694,300 | B1 | 2/2004 | Walker et al. |
| 6,695,204 | B1 | 2/2004 | Stinson et al. |
| 6,728,397 | B2 | 4/2004 | McNeal |
| 6,754,640 | B2 | 6/2004 | Bozeman |
| 6,758,394 | B2 | 7/2004 | Maskatiya et al. |
| 6,786,398 | B1 | 9/2004 | Stinson et al. |
| 6,808,109 | B2 | 10/2004 | Page |
| 6,810,385 | B1 | 10/2004 | Brady et al. |
| 6,814,283 | B2 * | 11/2004 | Fujimoto ............... 235/382 |
| 6,856,965 | B1 | 2/2005 | Stinson et al. |
| 6,882,641 | B1 | 4/2005 | Gallick et al. |
| 6,886,743 | B2 | 5/2005 | Brikho |
| 6,934,277 | B1 | 8/2005 | Werve et al. |
| 6,957,770 | B1 | 10/2005 | Robinson |
| 7,020,639 | B1 * | 3/2006 | Slater ..................... 705/75 |
| 2002/0062249 | A1 | 5/2002 | Iannacci |
| 2002/0077890 | A1 | 6/2002 | LaPointe et al. |
| 2002/0112177 | A1 | 8/2002 | Voltmer et al. |
| 2002/0113122 | A1 | 8/2002 | Brikho |
| 2002/0174009 | A1 | 11/2002 | Myers et al. |
| 2003/0009382 | A1 | 1/2003 | D'Arbeloff et al. |
| 2003/0015583 | A1 | 1/2003 | Abdi et al. |
| 2003/0023555 | A1 | 1/2003 | Rees |
| 2003/0037012 | A1 | 2/2003 | Mersky et al. |
| 2003/0065595 | A1 | 4/2003 | Anglum |
| 2003/0089768 | A1 | 5/2003 | Page |
| 2003/0120562 | A1 | 6/2003 | Clark et al. |
| 2003/0179290 | A1 | 9/2003 | Frazzitta et al. |
| 2003/0195800 | A1 | 10/2003 | Peters |
| 2003/0236704 | A1 | 12/2003 | Antonucci |
| 2004/0026500 | A1 | 2/2004 | Brikho |
| 2004/0054587 | A1 | 3/2004 | Dev et al. |
| 2004/0088295 | A1 | 5/2004 | Glazer et al. |
| 2004/0189472 | A1 | 9/2004 | Acosta et al. |
| 2004/0193522 | A1 | 9/2004 | Binet et al. |
| 2004/0234117 | A1 | 11/2004 | Tibor |
| 2004/0243665 | A1 | 12/2004 | Markki et al. |
| 2004/0258281 | A1 | 12/2004 | Delgrosso et al. |
| 2005/0035193 | A1 | 2/2005 | Gustin et al. |
| 2005/0068901 | A1 | 3/2005 | Nurminen et al. |
| 2005/0125295 | A1 | 6/2005 | Tidwell et al. |
| 2005/0125296 | A1 | 6/2005 | Tidwell et al. |
| 2005/0125337 | A1 | 6/2005 | Tidwell et al. |
| 2005/0125338 | A1 | 6/2005 | Tidwell et al. |
| 2005/0125339 | A1 | 6/2005 | Tidwell et al. |
| 2005/0125350 | A1 | 6/2005 | Tidwell et al. |
| 2005/0125351 | A1 | 6/2005 | Tidwell et al. |
| 2005/0125360 | A1 | 6/2005 | Tidwell et al. |
| 2005/0133587 | A1 | 6/2005 | Michelassi et al. |
| 2005/0137982 | A1 | 6/2005 | Michelassi et al. |
| 2005/0144133 | A1 | 6/2005 | Hoffman et al. |

FOREIGN PATENT DOCUMENTS

| | | |
|---|---|---|
| WO | WO 01/99072 A2 | 10/2002 |
| WO | WO 03/029928 A2 | 4/2003 |

OTHER PUBLICATIONS

Lawrence Aragon. Show me some ID. PC Week Online (http://www.zdnet.com/pcweek/0112/12bio.html) Jan. 1998.

Gerald Lazar. Agencies Scan Biometrics for Potential Applications. FCW.com (http://www.fcw.com.pubs.few.1997/0120/feature.htm) Jan. 1997.

Comparison of Biometric Identification Methods. http://www.and.nl/id/gen_biom.html. Dec. 1998.

The Speech Recognition API (SRAPI) Committee Announces Support for Speaker Verification. http:/www.srapi.com/svapipr.html. Oct. 1996.

New Technology Enables Computers to Identify, Verify User Voices. http://www.srapi.com/savpi/pr041597.html. Apr. 1997.

Accounting 5544. Biometric Technology. http://acctserver.cob.vt.edu/faculty.jhicks/acct5544/present/ddeverea.htm. Apr. 1997.

Vault FAQs. http://www/ImagineNation.com/Xanadu/Vault. Jun. 1997.

John Daugman. The Scientific Basis for Iris Recognition. Http://www.iriscan.com/basis.htm. Dec. 1998.

Electronic Banking 1. http://www.sjb.co.uk/eb1.html. Aug. 1998.

Biometric Technology Today (Btt). vol. 6(5) Sep. 1998.

Biometric Digest. Mar. 1998.

Biometrics in Human Services. vol. 2(1) Feb. 1998.

Biometric Access Corporation Debuts Enhanced Secure Touch-n-Pay Solution at FMI MERKETECHNICS 2002 Event, Press Release, Feb. 1, 2002.

Secure Touch-n-Pay RVS, 2003.

Biometric Access Company, Retail Industry Solutions, 2004.

BioPay Biometric Payment Services, Version 2.9 User's Manual, Mar. 1, 2001.

MophoTouch™ -Multi-Application Finger Identification in the Palm of Your Hand, Sagem Morpho, Inc., 1999.

"The Biometric Bar Tab Project." http://www.csee.wvu.edu/~wise/biometric/index.htm, including Dec. 9, 2002 Proposal and May 5, 2003 Team Report.

Secure Check Cashing Systems. Network Services. http://www.securecheckcashing.com/dev/network.html.

Secure Check: System Features. http://securecheckcashing.com/quadflyer.pdf. Apr. 22, 2005.

Softwise: Business Automation Solutions. http://www.softwiseonline.com. Apr. 22, 2005.

* cited by examiner

SYSTEM AND METHOD FOR NEGOTIABLE INSTRUMENT CASHING FEE SETUP BY TYPE

This application is a continuation-in-part of application Ser. No. 10/142,687, filed May 10, 2002, now U.S. Pat. No. 6,957,770, which is incorporated by reference herein, in its entirety, for all purposes.

FIELD OF THE INVENTION

This application relates generally to the cashing of negotiable instruments. More particularly, the present invention relates to the sharing, automatic application and updating of preferences regarding fees and surcharges for the cashing of negotiable instruments.

BACKGROUND OF THE INVENTION

Generally, merchants cashing negotiable instruments charge fees for their services. It would be helpful for these merchants to have a systematic, easily updateable and secure means to set and update preferences for the fee levels charged according to the nature of the negotiable instrument presented for cashing. It would also be helpful for these merchants to have the ability to impose additional surcharges based upon other incidental circumstances relating to the negotiable instrument, the presenter, or the cashing transaction.

SUMMARY OF THE INVENTION

The present invention addresses the aforementioned needs by providing a system and a method that, as an aspect of a negotiable instrument cashing system, offers negotiable instrument cashing merchants the ability to readily customize, store locally or centrally, and update manually or automatically, preferences related to negotiable instrument-cashing transaction fees, surcharges and the like. It is a further feature of the present invention to allow continual or periodic synchronization of these preferences between multiple authorization stations connected to the system.

BRIEF SUMMARY OF THE DRAWINGS

In order to describe the manner in which the above-recited and other advantages and features of the invention can be obtained, a more particular description of the invention briefly described above will be rendered by reference to specific embodiments thereof that are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE INVENTION

Figure 1:
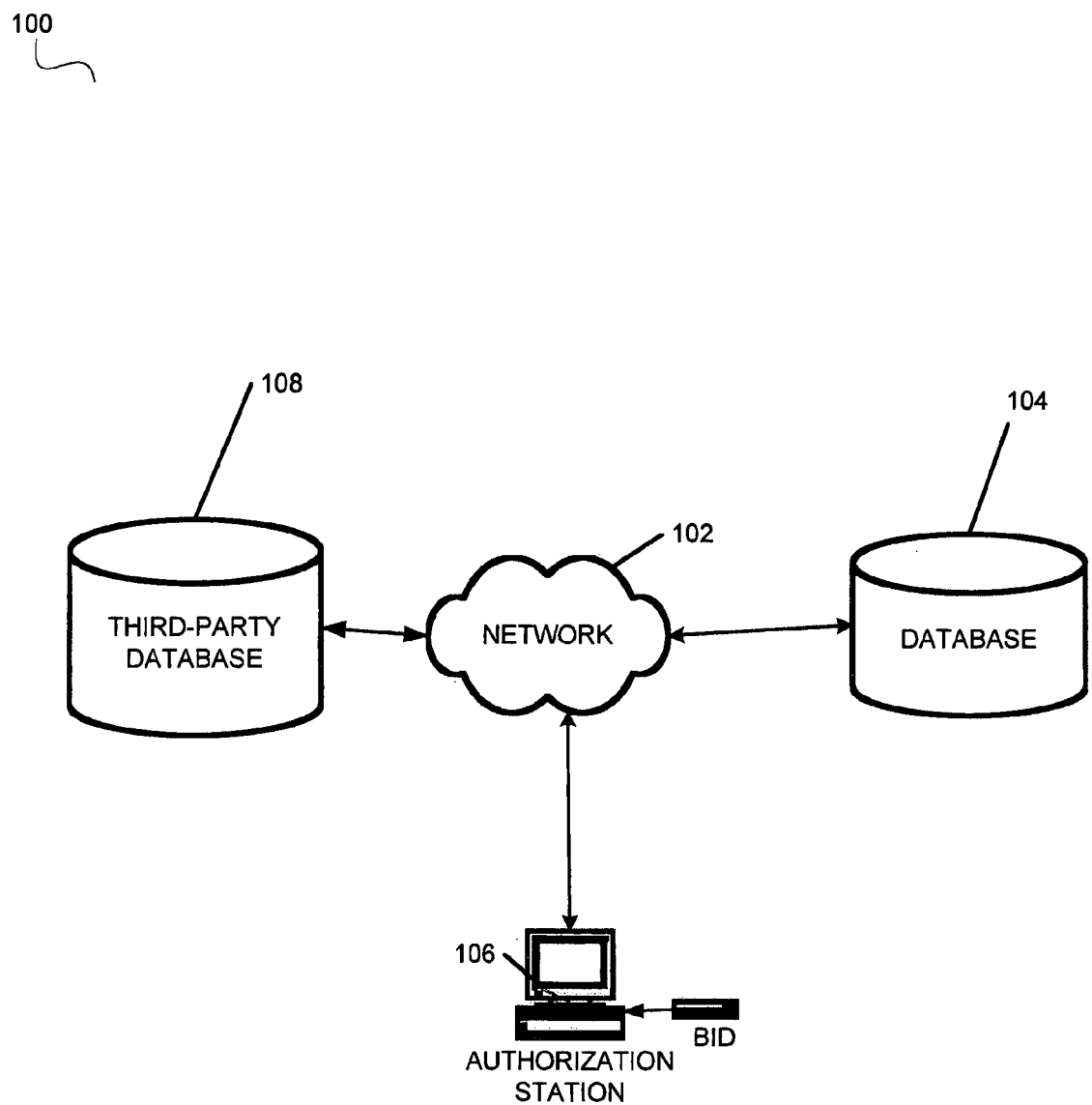
FIG. 1 illustrates a general architecture overview of a negotiable instrument cashing system (NICS).

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Methods of maintaining and applying preferences for fee and surcharge rates to negotiable instrument (NI)-cashing transactions vary widely, but are often not optimized for ease of use by both NI-cashing merchants and their employees, hereafter also referred to as cashers. These cashers have a need to structure and customize preferences in their NI-cashing systems because different types of NIs presented for cashing entail different levels of risk for the NI-cashing merchant. Thus, maintaining a single fee level for all types of NIs cashed increases the NI-casher's exposure to potential fraud or defaults. For example, cashing a "starter check," which is typically given to a new bank account holder, presents a greater risk to a merchant, because account holder identification information is not printed on the check. Therefore, a casher might require a presenter who is presenting a starter check for cashing to pay a higher fee for the service. Moreover, an unscrupulous casher employed by an NI-cashing service might intentionally apply incorrect fees for personal profit, or in collusion with presenters. For example, a casher might pocket a portion of the fee, or charge an acquaintance a lower fee for an NI-cashing transaction. Additionally, a casher might make errors with regards to NI-cashing transactions, such as accepting NIs for cashing that should be rejected, and the NI-cashing merchant might wish to track which employees and transactions involved these types of errors.

Additionally, for NI-cashing merchants with differing fee structures based upon circumstances, maintaining accurate records and charging appropriate fees can be confusing and time consuming. Locating information about particular NI-cashing transactions may require exhaustive manual searches of files and records.

It is a feature of the present invention to offer NI-cashing merchants the ability to set customized NI-casher preferences for fee and surcharge levels in the system based on the type of NI or the circumstances of presentment. The casher preferences could relate to NI categorizations, the application of fees and surcharges to NI-cashing transactions, and the like, and could be stored at a database for one or more NI-cashing merchants or entities. Casher preferences could be applied to a single NI-cashing merchant's transactions, or to affiliated cashers sharing the system, such as a chain of NI-cashing merchants with multiple locations. The casher preferences could also be differentiated among the affiliated cashers, for example, applying some preferences to cashers located in one area and a different set of preferences to affiliated cashers in another location.

The system offers authorization stations, such as check-cashing stations or terminals, personal computers, or other stations networked with the database, with easily navigable screens where NI-cashers can set fee levels, record transactions, categorize NIs by type, and calculate charges. As an enhancement to an NICS, the present invention offers merchants the ability to charge fees based on the type of NI they are cashing, for example, government, payroll, and the like. An additional fee grid can be provided on an existing fee options screen where NI types and associated fee amounts can be configured. NI-cashers could also define surcharge fee types and amounts that should be charged for each type.

During the NI-cashing process the casher could choose the NI type, and the fee could automatically be calculated based on the preconfigured fee grid. An NI type could also be saved for each maker based on a selection from a transaction screen or could be entered at a maker information screen. Surcharges (when applicable) could be applied to each specific transaction for which they are used. As an additional feature, the NI-cashing database could be searchable based on a categorized NI type, NI maker, NI maker type and surcharge type.

The present invention offers a significant advantage to NI-cashing merchants by providing a system for customizing and applying fee and surcharge level preferences for one authorization station or location as well as for multiple networked cashers at different locations. Moreover, the system could be configured to update all connected authorization stations when changes are applied at one station, or such updates could be selectively adopted. In another embodiment, authorization stations connected to the system could retrieve updates or preference changes from a central database or controlling authorization station each time they log on to the network or at designated times.

An additional advantage of the present invention is that, as a security measure, biometric authorization of cashers could create a clear link between the casher and specific transactions, thus enabling record-keeping of casher transaction approvals that could be monitored for fraudulent activities or casher errors.

In one embodiment, the NICS could conduct casher and presenter authorizations and transactions via biometric authorization. In general, a biometric authorization refers to an authorization in which either a presenter, such as a customer requesting the cashing of an NI, or a casher, such as an owner or employee of an entity offering NI-cashing services, provides biometric data to be matched against a biometric record in a database. For example, a presenter could undergo biometric authorization to complete an NI cashing transaction or a casher could undergo biometric authorization to adjust fee rule preferences for an NI-cashing merchant. As would be appreciated, the location of the database as well as the specific mechanism by which the biometric data is matched to a particular biometric record would be implementation dependent and would not be limiting on the scope of the present invention. Thus, in a biometric authorization, the biometric data taken during the authorization can be matched against registered biometric data at a location where the registered biometric data is stored or where the authorization biometric data is gathered. In addition, biometric data received during an authorization could be tested for liveness to prevent system fraud. Alternatively, the NICS could provide non-biometric access for presenters and/or cashers who have nonviable biometric data or who wish to employ the NICS without the use of biometric data.

Additionally, the principles of the present invention are not limited to using one form of biometric. For example, the biometric data referred to throughout this description can represent a biometric image (or sample) and/or a mathematical representation of the biometric image, often referred to as a biometric "template". In one example, a biometric template can represent any data format that includes feature, positional, or other representing information of characteristics of biometric data. Alternatively, a template could be a mathematical representation of more than one biometric. For example, a presenter template can be generated from biometric data acquired from two individual fingers, such as a thumb and index finger, or from a finger and an iris scan. The biometric data can include fingerprint data, iris data, facial data, voice data, retinal data, hand architecture data, DNA data, or any other physical measurement pertaining to a presenter's or casher's person.

FIG. 1 illustrates a general architecture overview of NICS 100. As will be described in detail below, NICS 100 enables a convenient means to offer NI-cashing merchants the ability to more securely process NI-cashing transactions, categorize NIs by type, and to set custom fee preferences based on the type of NI, the circumstances of presentment or any other factors deemed relevant. Casher preferences, NI-categorizations and transaction information are stored in database 104 where casher and presenter records are stored. Database 104 can represent one or more databases utilized within the system. In one embodiment, database 104 is a central database in which casher preferences and transaction records are stored and accessed for updating or application. In another embodiment, database 104 also includes one or more casher databases from which a select set of presenter and casher records are accessed. A presenter or casher record can be designed to include information useful for authenticating a presenter or casher, such as a name, identification number, passcode, device identification numbers associated with the casher, an address, and a phone number. As previously mentioned, a casher can be an individual or entity that has administrative capabilities in the NICS, but is not directly employed by the NICS, such as an NI-cashing merchant or clerk employed by a NI-cashing merchant. These capabilities can range from being permitted to access, set and change NI-cashing fee preferences to overseeing a biometric authorization to having access to presenter records. In an alternate embodiment of the present invention, casher records also include employer information if the casher is an employee of another casher. In another embodiment of the present invention, casher records include an additional casher identifier, such as a system identification number (SID), passcode, and/or casher biometric data. In one scenario, a casher could undergo biometric authorization before administering an NI-cashing transaction.

In an additional embodiment, NICS 100 can utilize a combination of central databases and one or more casher databases. In general, embodiments utilizing a combination of databases enable increased control of information flow throughout NICS 100. As described in detail below, various examples of information flow configurations within the system can include "closed" and "selectively shared" system models. In the preferred embodiment of the present invention, NI-casher preferences and presenter information could be selectively shared among cashers employed by an NI-cashing merchant at multiple locations. In still further embodiments, database 104 can further comprise one or more sub-databases that are contained within a particular database, partitioned, for example, to accommodate multiple, separate, NI-cashing merchants. In such embodiments, presenter data, casher data, and other system data can be distributed across multiple databases within database 104.

Database 104 and third-party database 108 are connected to network 102, which can be, but is not limited to, the Internet. Networks used in additional embodiments include local area networks (LANs), wide area networks (WANs), and telephone networks. Network 102 comprises connections to at least one authorization station (AS) 106 where a casher or a presenter can be process an NI-cashing transaction. AS 106 can include, but is not limited to, at least one attached biometric input device (BID) and the necessary means for sending and receiving information to and from a presenter and to and from a database. These stations include but are not limited to a vending machine, a kiosk, a personal computer, a presenter service desk, an NI-cashing terminal, a telephone, and a wireless device connected via a wireless network. The BID is illustrated in FIG. 1 as a peripheral device for purposes of emphasis only. AS 106 could also include an integrated BID. AS 106 could also comprise one or more additional authorization stations that might be affiliated and share presenter information and casher preferences.

Additional embodiments of the system also comprise connections to one or more third party information sources, such as third-party database 108, in which presenter information, such as presenter biometric data, is verified and/or from which presenter information is retrieved. In an additional embodiment, third party database 108 can include one or more financial sources in order to facilitate the NI-cashing transaction. For example, third party database 108 may contain account information relating to an NI presented for cashing.

Information transferred in the system can be encrypted. For example, information could be encrypted at one point and sent across a non-secure connection between points or not encrypted at a point of communication and sent to the other point of communication across a secure connection. Encryption and decryption of these messages can be monitored by services provided by a security company such as VeriSign. In one scenario, as an added level of security, information internal to a terminal and which is never transmitted is also encrypted. This prevents retrieval of sensitive information (e.g., biometric data) from a stolen terminal. In an additional embodiment, the system incorporates one or more anti-tampering methods by which to recognize authentic and non-authentic system requests.

In one embodiment, the system is configured as a "closed" system, where information entered into the system via a specific casher AS 106 is transmitted to and stored in database 104 specific to that casher, and this information is not shared with another AS or database. This is referred to as a "closed" system because casher preferences are stored only in the database that serves their specific casher AS 106. For example, a merchant who is a casher in the system and who wishes to set fee preferences only for his location might have a system configured with his own database. In this system configuration, the merchant's database files could only exist on the database and could be retrieved or accessed only by pre-determined stations connected to the database; therefore, the system would be a "closed" system. Database 104 in closed systems can communicate with other databases, such as third-party database 108. In an alternate embodiment of the closed system, information is stored in a partitioned database 104. Casher-related information is stored in casher-specific partitions and is closed to all other cashers. Only an authorized casher and other authorized entities, such as an employee of NICS 100, can access that partition of database 104. In yet an additional embodiment, information stored in one database or database partition could be stored in another database or database partition. Such an embodiment is useful for information protection in the event database information is lost.

In a further embodiment of the present invention, information entered into the system via a casher AS 106 is "selectively shared" and stored in select system multiple-casher databases or select system multiple-casher partitions within database 104. In this embodiment, a group of NI cashers share data with each other and they can choose whether to share system information with other cashers within the system. This system allows a chain of NI cashing locations owned by the same entity or linked in some other manner to share casher preferences, NI categorizations and transaction records without sharing that information with other non-designated cashers registered in the system. Information in such a system can be shared between one or more databases freely or sharing could be monitored by rules set in the one these databases or a combination thereof. By way of illustration and not as a limitation, one casher could share NI-cashing preferences with one of five cashers or only select cashers, such as managers, could be authorized to send or store fee rules or other information to database 104. Such a system allows cashers greater control over information flow while still allowing various casher conveniences, such as being able to update and set casher preferences for all stores at any store in a selectively shared chain.

The configuration of the system as a "closed" system or "selectively shared" system illustrates various ways of implementing the principles of the present invention. System configuration could be determined by the system in which presenter information is used.

Figure 2:
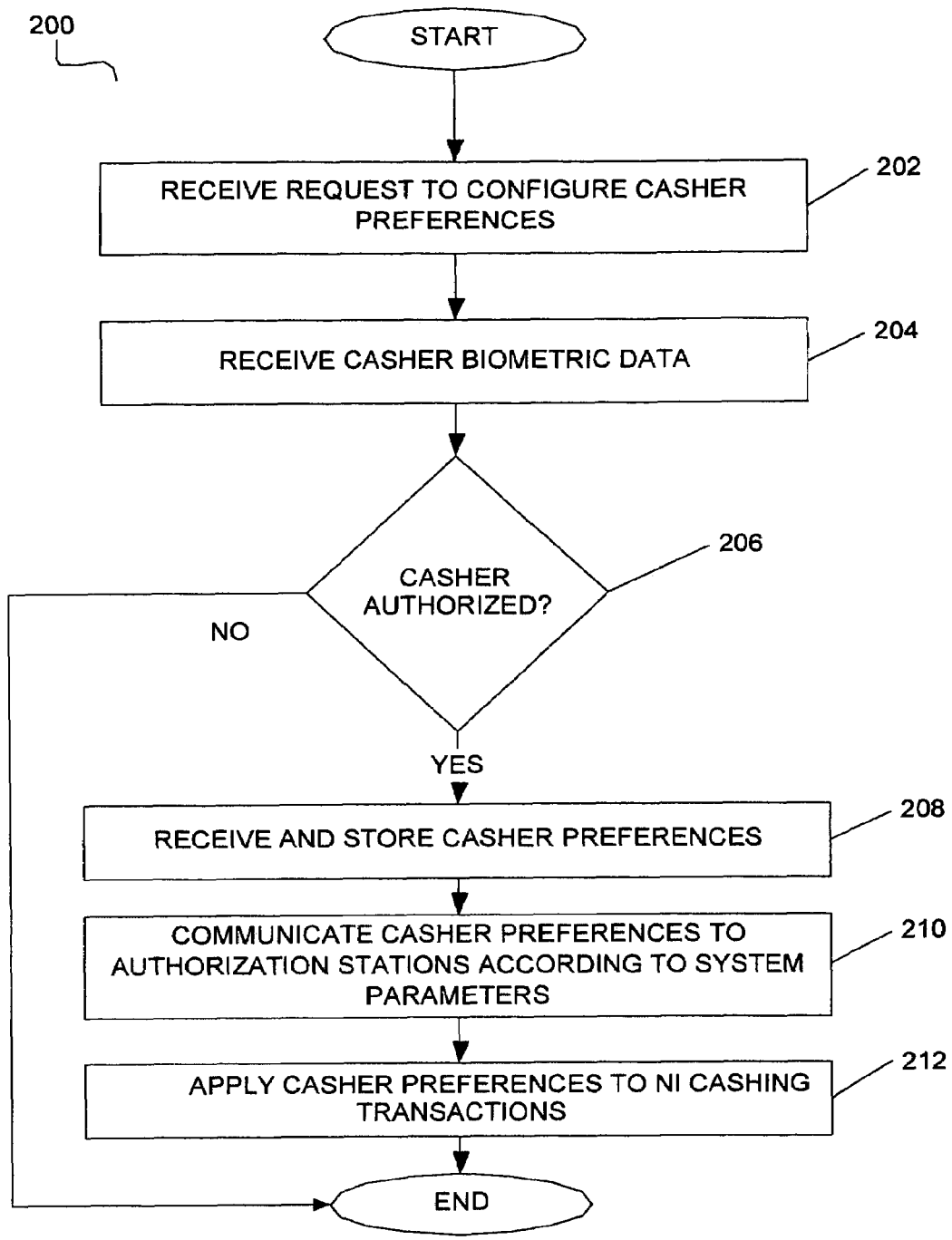
FIG. 2 illustrates a flowchart of a process for configuring casher preferences, automatically updating changes to authorization stations connected to the system, and applying updated casher preferences to subsequent negotiable instrument cashing transactions via the NICS.

FIG. 2 illustrates a flowchart of a process for configuring casher preferences, automatically updating changes to authorization stations connected to the system, and applying updated casher preferences to subsequent negotiable instrument cashing transactions via the NICS.

At step 202, the system receives, at AS 106, a request from a casher to configure casher preferences. As previously noted, the casher could be an NI-cashing merchant or an employee of an NI-cashing merchant.

At step 204, the casher's biometric data is obtained. The system obtains casher biometric data in order to verify that the casher is authorized to set and/or change fee preferences and/or other system parameters. In system embodiments not utilizing casher biometric authorization, the casher could submit an identifier, such as an SID, a passcode or the like, instead of biometric data in order to verify authorization to set and/or change fee preferences. Furthermore, in another embodiment, the system could receive both casher biometric data and an identifier for authorization purposes. For example, an identifier could indicate a record that contains the necessary data for biometric authorization. At step 206, the system determines whether the casher is authorized to perform the requested action. The determination could be based upon a comparison and match of submitted casher biometric data with casher biometric data stored in a casher record, and an indication in the casher record as to whether a casher so identified has authority to perform the requested action. A casher's level of authority could be additionally contained in the casher record, or casher authority levels could be set according to system parameters, including job title, experience, location, and the like.

If the casher is authorized, the system receives and stores casher preferences at database 104 at step 208. Casher preferences could set fee rules based upon a number of factors, such as the type of NI presented, the NI maker, value of the NI, the NI presenter, type of ID carried by the presenter, the location of the authorization station, date or time of presentment, and other circumstances or factors the casher deems relevant. For example, a casher might wish to charge a surcharge fee in addition to the standard fee for NIs having specific characteristics, such as starter checks, checks with handwritten amounts, out-of-state checks, checks with sequence numbers below 100, and the like. Moreover, an additional surcharge fee could be applied to an initial NI-cashing transaction, or a negative surcharge to subsequent transactions. As another example, a casher could set a rule to charge either a flat fee or a percentage fee, or a combination of the two, for an NI transaction based upon the circumstances of presentment.

At step 210, updated preferences are shared with additional authorization stations 106 according to system setup and parameters. The updated preferences could be implemented with affiliated casher authorization stations connected to network 102. As aforementioned, NICS 100 can be implemented in either a "closed" or "selectively shared" system. Therefore, the affiliated casher stations could be at one NI-cashing location or at several NI-cashing locations. For example, network 102 could be a local network connecting several authorization stations in one NI-cashing location or network 102 could be the Internet connecting the several authorization stations of an NI-casher chain. In one scenario, when a casher updates casher preferences at database 104, the updated preferences could be automatically synchronized with all authorization stations affiliated with the updating casher. The synchronizing could be accomplished in a number of ways. In one embodiment, the preferences could be updated at a central location and stored in database 104. A local AS 106 could query database 104 at startup and update locally according to the updated casher preferences. Alternatively, database 104 could communicate the updated preferences to affiliated authorization stations when casher preferences are updated, or at regular times as defined by system parameters. For example, network 102 might synchronize preferences every twenty minutes during operating hours. Alternatively, updated preferences could be communicated from one casher AS 106 to other selected stations via network 102. Updated preferences could be sent to some affiliated authorization stations, but not others. The system could additionally make a determination as to which stations received updated preferences. For example, preferences regarding a fee charge might be updated according to geographic location, such as an area deemed to be at high risk for fraudulent transactions. In one embodiment, the casher record could contain an indication of casher location, such as a casher location identifier, an authorization station identifier, or the like. Alternatively, if cashers conduct NI-cashing transactions at varied geographic locations, a casher's location could be indicated by an identifier of the authorization station used or casher location could be indicated when the casher logs onto NICS 100, such as via biometric authorization.

In an additional embodiment, if AS 106 is disconnected from network 102 during a system synchronization when preferences are updated, AS 106 could issue a query via network 102 for any necessary updates when a connection is reestablished. Each connected AS 106 could also send a confirmation message via network 102 upon successful receipt of updated casher preferences.

At step 212, the stored/updated casher preferences are applied to subsequent NI-cashing transactions at AS 106. As previously noted, the same preferences need not be applied at each AS 106 connected to network 102; different sets of preferences could be selectively applied according to system parameters.

Figure 3:
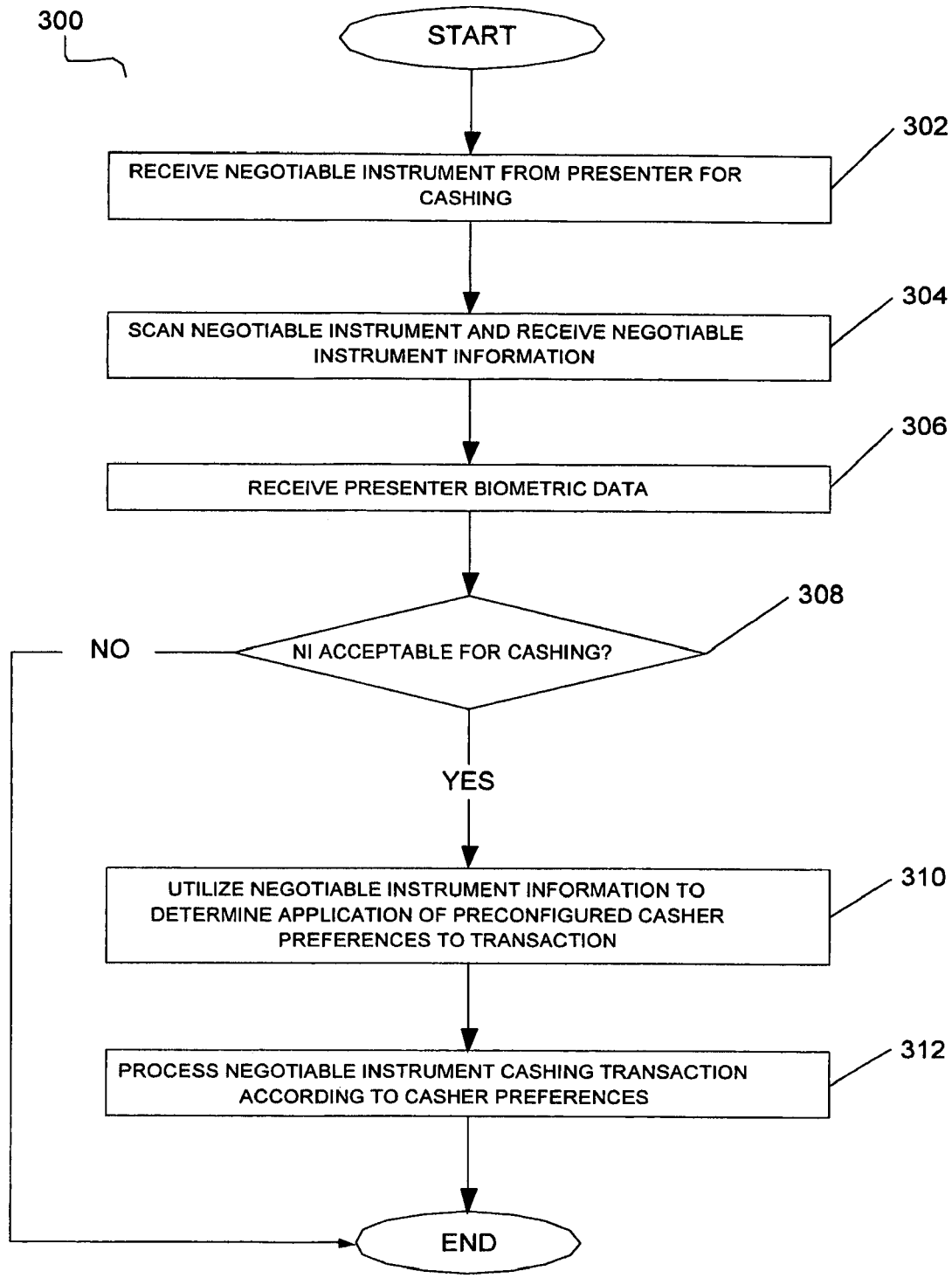
FIG. 3 illustrates a flowchart of a process for utilizing preconfigured casher preferences in a negotiable instrument transaction.

FIG. 3 illustrates a flowchart of a process for utilizing preconfigured casher preferences in an NI transaction.

At step 302, a casher receives an NI presented by a presenter for cashing. The NI is scanned, at step 304, and NI information is received by the system. As an example, such information might include account number, amount, maker information, or any other information that could be obtained from the NI. Along with scanned NI information, additional NI information can be input by the casher.

At step 306, the presenter's biometric data is received by the system. The received presenter biometric data is compared with biometric data stored in a presenter record. If sufficiently matching biometric data is found, information in the corresponding presenter record is utilized to aid in determining, at step 308, if the NI should be accepted for cashing. Typically, if the presenter's record does not indicate a negative transaction history, NICS 100 recommends the cashing of the NI. NI information could also be compared to stored NI data to see if negative information is stored relating to the NI account or maker. In an additional embodiment, the casher also submits biometric data to be authorized to conduct the NI-cashing transaction, or to be identified as the authorizing/approving casher.

If the NI is accepted for cashing, at step 310 the system utilizes the received NI information to apply preconfigured casher preferences to the NI-cashing transaction. For example, NI information could be used to determine the applicable fee or fees to charge for processing the NI-cashing transaction. In one embodiment, the preconfigured preferences are automatically applied to the transaction by the system. In another embodiment, the casher could approve and adjust the application of preferences.

At step 312, the NI-cashing transaction is processed according to the applied casher preferences. For example, a new presenter presenting a government NI might be automatically charged a standard percentage or flat fee for cashing a government NI and an additional new user surcharge by the system.

In an additional embodiment, the system could maintain searchable records of each NI-cashing transaction in database 104. The records could be categorized according to the maker, the NI type, the presenter, or the like, and the records could additionally be accessed to apply appropriate fees to subsequent NI-cashing transactions. For example, a presenter's transaction history might be utilized to determine an appropriate fee, such as a reduced standard fee for a loyal presenter, or a particular NI maker might prove troublesome and transactions involving the presentation of an NI from that maker might be assessed a surcharge.

In another embodiment, if an NI is presented from an NI maker not previously categorized in the system, the NI type entered or assigned during the initial cashing transaction could be automatically assigned to NIs from the same maker at future transactions. Cashers could leave the default setting of "Not Specified" if they do not wish to assign an NI type to that maker. The casher could manually enter the NI type, or the NI type could be recognized and categorized according to information gathered from the NI. For example, the system could gather information from a magnetic ink character recognition (MICR) scan and a scan providing an account number from an account previously categorized by a casher could be used to automatically categorize the presented NI as the same type. Alternatively, the NI could be optically scanned and NI type determined by optical character recognition (OCR). For example, via an OCR scan, NICS 100 could recognize checks with no name and address (e.g. starter checks), or recognize a business or personal check based on the identifying information. The casher could be given the option to accept or override the categorization.

A system and method for sharing, automatic application and updating of casher preferences regarding fees and surcharges for the cashing of negotiable instruments has been illustrated. It will be appreciated by those skilled in the art that the system and method of the present invention can be used to readily customize, store locally or centrally, and update manually or automatically, preferences related to negotiable instrument-cashing transaction fees, surcharges and the like, as well as to allow continual or periodic synchronization of these preferences between multiple authorization stations connected to the system. It will thus be appreciated by those skilled in the art that other variations of the present invention will be possible without departing from the scope of the invention disclosed.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention. Therefore, the above description should not be considered to be exclusive of these other embodiments. Also, it is to be understood that the phraseology and terminology employed herein are for the purposes of description and should not be regarded as limiting.

What is claimed is:

1. A method of defining, storing and sharing casher preferences for negotiable instrument cashing transactions via a negotiable instrument cashing system, comprising:
   at a first authorization station, receiving casher data, said data including casher biometric data;
   verifying an identity of said casher, based on a comparison of said received casher biometric data with registered casher biometric data;
   if an identity of said casher is verified, determining whether said casher is authorized to define preferences;
   if said casher is authorized to define preferences, receiving one or more casher negotiable instrument cashing preferences;
   communicating said casher preferences to a database; and
   storing said casher preferences at said database, wherein said stored casher preferences are used to automatically update one or more additional authorization stations that apply said stored casher preferences to negotiable instrument cashing transactions.

2. The method of claim 1, wherein said casher preferences include one of negotiable instrument cashing fees, negotiable instrument cashing surcharges, negotiable instrument maker categorizations and negotiable instrument type categorizations.

3. The method of claim 1, wherein said casher preferences are accessed based on at least a casher identifier.

4. The method of claim 3 wherein said casher identifier is casher biometric data.

5. The method of claim 1, wherein said casher is further enabled to alter said stored preferences.

6. The method of claim 1, wherein said database is one or more of a local database and a central database.

7. The method of claim 1, wherein said automatic updating occurs at one or more of a startup of said one or more additional authorization stations, casher log on to said one or more additional authorization stations, an interval specified according to system parameters, a time specified according to system parameters, and a casher request.

8. The method of claim 1, wherein said automatic updating is selectively communicated to a subset of said one or more additional authorization stations according to system parameters.

9. A method for defining and applying casher preferences, comprising:
   at an authorization station, receiving casher data, said data including casher biometric data;
   verifying an identity of said casher based on a comparison of said received casher biometric data with registered casher biometric data;
   if said comparison indicates that said casher is authorized to define preferences, receiving one or more casher negotiable instrument cashing preferences;
   storing said casher preferences;
   receiving negotiable instrument information that is presented by a presenter and endorsed by a negotiable instrument maker;
   receiving biometric data from said presenter;
   comparing said biometric data of said presenter with registered presenter biometric data;
   determining whether said negotiable instrument should be accepted for cashing;
   if said negotiable instrument is accepted for cashing, determining one or more of a fee and a categorization for the transaction, wherein said determining includes identifying which of said casher preferences apply to said transaction;
   processing said transaction, wherein said processing includes the application of said casher preferences to said transaction; and
   storing information relating to said transaction in a transaction record.

10. The method of claim 9, wherein said casher negotiable instrument cashing preferences include one or more of negotiable instrument cashing fees, negotiable instrument cashing surcharges, negotiable instrument maker categorizations and negotiable instrument type categorizations.

11. The method of claim 9, wherein said application of said casher check cashing preferences comprises at least collecting from said presenter one or more of a flat fee and a percentage fee.

12. The method of claim 9, wherein said casher inputs said negotiable instrument information.

13. The method of claim 12, wherein said inputting includes a designation by said casher of one or more negotiable instrument categorizations for said negotiable instrument.

14. The method of claim 13, wherein subsequently presented negotiable instruments drafted by said negotiable instrument maker are automatically categorized according to said designated negotiable instrument categorizations.

15. The method of claim 14, wherein said casher is enabled to override said automatic categorization.

16. The method of claim 9, wherein said negotiable instrument information is received by scanning said negotiable instrument.

17. The method of claim 16, wherein said scanned negotiable instrument information determines a negotiable instrument categorization for said negotiable instrument.

18. The method of claim 17, wherein said casher is enabled to override said negotiable instrument categorization.

19. The method of claim 9, wherein said casher is enabled to access said transaction record.

20. The method of claim 19, wherein said casher submits biometric data to authorize said accessing.

21. A method for automatically applying casher preferences to a negotiable instrument cashing transaction, comprising:
   receiving, from a presenter, negotiable instrument information, wherein said receiving includes scanning said negotiable instrument;
   receiving, at a local device, biometric data from said presenter;
   receiving, at said local device, biometric data from a casher,
   comparing said biometric data of said presenter with registered presenter biometric data;
   determining, based on one or more of information contained in a presenter record and said negotiable instrument information, whether said negotiable instrument should be accepted for cashing;
   comparing said biometric data of said casher with registered casher biometric data, said comparison being used to verify and record said casher's identity, determining, based on information retrieved by said scanning, one or more of a fee and a categorization for the transaction, wherein said determining further includes accessing one or more preconfigured fees and categorizations stored at a database;

processing said transaction, wherein said processing includes the application of one or more of said fee and categorization to said transaction; and storing information relating to said transaction in a transaction record.

22. The method of claim 21, wherein said scanning is performed by one or more of a magnetic ink character recognition device and an optical character recognition device.

23. The method of claim 21, wherein said casher is enabled to override said determining of said fee and categorization type.

24. A method of defining and storing casher preferences for negotiable instrument cashing transactions via a negotiable instrument cashing system, comprising:

at an authorization station, receiving casher data, said data including a casher identifier;

verifying said casher's identity, based on a comparison of said received casher data with registered casher data;

if said comparison indicates that said casher is authorized to define preferences, receiving one or more casher preferences pertaining to one or more of negotiable instrument cashing fees, negotiable instrument cashing surcharges, negotiable instrument maker categorizations and negotiable instrument type categorizations; and storing said casher preferences at a database, wherein said stored casher preferences are used to automatically update one or more additional authorization stations that apply said stored casher preferences to negotiable instrument cashing transactions.

25. The method of claim 24, wherein said casher identifier is one of a passcode, information contained on a token or casher biometric data.

26. The method of claim 24, wherein said automatic updating occurs at one or more of a startup of said one or more additional authorization stations, casher log on to said one or more additional authorization stations, an interval specified according to system parameters, a time specified according to system parameters, and a casher request.

27. The method of claim 24, wherein said automatic updating is selectively communicated to a subset of said one or more additional authorization stations according to system parameters.

* * * * *